(12) United States Patent
Kinoshita et al.

(10) Patent No.: US 6,445,849 B2
(45) Date of Patent: Sep. 3, 2002

(54) WAVELENGTH MULTIPLEXER AND OPTICAL UNIT

(75) Inventors: Taira Kinoshita; Tatemi Ido, both of Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/809,254

(22) Filed: Mar. 16, 2001

(30) Foreign Application Priority Data

Jun. 19, 2000 (JP) ........................................ 2000-187539

(51) Int. Cl.$^7$ ................................................ G02B 6/42
(52) U.S. Cl. .............................. 385/24; 385/14; 385/45
(58) Field of Search .............................. 385/24, 37, 14, 385/15, 46, 45, 16

(56) References Cited

U.S. PATENT DOCUMENTS 5,889,900 A * 3/1999 Hallemeier ................ 385/24 X

FOREIGN PATENT DOCUMENTS

JP  8-190026  7/1996

OTHER PUBLICATIONS

L.B. Soldano et al, "Optical Multi–Mode Interference Devices Based on Self–Imagaing: Principles and Applications", Journal of Lightwave Technology, vol. 13, No. 4, Apr. 1995, pp. 615–627.

* cited by examiner

Primary Examiner—Phan T. H. Palmer
(74) Attorney, Agent, or Firm—Mattingly, Stanger & Malur, P.C.

(57) ABSTRACT

The subject to be attained by the disclosed technique is to provide an optical unit less expensive than conventional like optical units and having a wavelength multiplexer and optical waveguides. For achieving the above subject there is provided a wavelength multiplexer wherein a light combining/branching section is constituted by a multi-mode interference type optical waveguide, and an incident-side optical waveguide and a reflection-side optical waveguide are spaced a predetermined distance from each other at their connections to the multi-mode interference type optical waveguide. An optical filter is installed in the multi-mode interference type optical waveguide and a multi-mode interference is set so that a peak in a light intensity distribution is formed in the vicinity of an inlet of each of an exit-side optical waveguide and the reflection-side optical waveguide.

9 Claims, 10 Drawing Sheets

WAVELENGTH MULTIPLEXER AND OPTICAL UNIT

BACKGROUND OF THE INVENTION

The present invention relates to an optical unit having optical waveguides, particularly an optical unit having a so-called MMI (Multi-Mode Interference) type optical waveguide. According to the present invention it is possible to provide a wavelength multiplexer of an extremely good quality.

With the recent development of multi-media communication, including the Internet, studies are becoming more and more extensive about WDM (Wavelength Division Multiplexing) technique which is intended to attain a high-speed large-capacity communication. As one of optical parts which are important for building a WDM communication system there is known a wavelength multiplexer which combines or branches wavelengths of light having plural wavelengths. Above all, what is attracting attention of many concerns from the standpoint of attaining the reduction of cost and size and a high function is a method wherein optical waveguides using quartz (glass) or a polymer for example and a wavelength multiplexer are formed on a substrate and optical transmitter and receiver are mounted thereon to achieve integration.

As the wavelength multiplexer there is known, for example, a directional coupler type or a Mach-Zehnder interferometer type. Further, in connection with the technique advantageous to the reduction in size of a module, there is known, for example, such a technique as is disclosed in Japanese Patent Laid Open No. Hei 8-190026 (Article 1).

FIG. 1 shows a filter type wavelength multiplexer described in the above Article 1. In this optical wavelength multiplexer, linear optical waveguides 1 and 2 are crossed and an optical filter 4 is disposed in a cross point of the two. In the illustrated example, a WDM signal is divided into reflected light and transmitted light by utilizing wavelength transmitting and reflecting characteristics of the optical filter 4. According to this structure it is necessary to make design in such a manner that an intersecting point 3 of the axes of the two optical waveguides 1 and 2 which intersect each other at an angle of 2θ lies on an equivalent reflection center plane 5 of the optical filter 4. In FIG. 1, central axes of the optical waveguides 1, and 2 are indicated at 6, and 7 respectively.

SUMMARY OF THE INVENTION

It is the first object of the present invention to enlarge the tolerance for a deviation of an installed position of reflecting means typical of which is an optical filter installed within an optical guide in an optical unit utilizing light reflected by the reflecting means, the optical unit being typified by a wavelength multiplexer. In other words, it is the first object of the invention to minimize the increase of loss in the optical unit based on a deviation of the installed position of the reflecting means.

It is the second object of the present invention to diminish an optical crosstalk in the above optical unit, especially a wavelength multiplexer.

A typical form for achieving the above first object of the invention can take the form of, for example, a wavelength multiplexer which is formed on a plane substrate and which functions to combine or branch wavelengths of a signal light having plural wavelengths. According to the present invention it is possible to achieve the above first and second objects together.

A typical mode of the present invention resides in an optical unit having optical waveguides, including at least first, second and third optical waveguides, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces of the fourth optical waveguide being end faces intersecting the traveling direction of light in the fourth optical waveguide, and the fourth optical waveguide being an optical waveguide capable of propagating light in a multi-mode such that upon input of light having a first wavelength from either the second or the third optical waveguide, light corresponding to the light input of the first wavelength can be propagated into the first optical waveguide after passing through the optical filter by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection by the optical filter.

The principle of the present invention will now be described. FIG. 7 is schematically illustrates in what manner light of a wavelength passing through a filter 15 in wavelength multiplexer according to the present invention is incident from a waveguide 12 (distance from a center line: D), then is propagated through a multi-mode interference type waveguide 10 and is emitted to a waveguide 11. In the multi-mode interference type waveguide 10, for example, a signal light incident from the second optical waveguide 12 excites various modes of lights in the multi-mode interference type optical waveguide 10. Although in FIG. 7 show excited states of zero-, first- and second-order modes, there may be excited higher modes. Since the propagation velocities of the excited modes are different from one another, there occur phase differences from one another with propagation through the multi-mode interference type waveguide (as shown FIG. 7), and a light intensity distribution, which is the sum of the modes, changes as light is propagated through the multi-mode interference type waveguide. This change is periodical and it is known that at a cycle Lp light intensity distribution is reproduced again into the same shape as an input section (self-imaging of the multi-mode waveguide). The light intensity distribution at the position of Lp/2 which is half of the said period corresponds to a reflected image obtained by folding back the light intensity distribution of the input section symmetrically with respect to the center line of the multi-mode optical waveguide. In the present invention, the length (L) of the multi-mode waveguide is set at the above Lp/2 and the center of the first optical waveguide 11 is placed at the center of peak (i.e., the position of distance D from the center line) of a symmetric optical intensity distribution which occurs at an outlet of the multi-mode optical waveguide, whereby the incident light from the second optical waveguide can be guided again through the optical waveguide 11 with scarcely any loss.

Also as to the case where light of a wavelength reflected by the filter 15 is incident on the above wavelength multiplexer, the same argument as above also applies except that the light is reflected by the filter 15. More particularly, if the filter is installed at a position of L/2=(Lp/2)/2 from the inlet, the light incident from the waveguide 12 is reflected by the filter 15 and thereafter reproduces, at the inlet of the multi-mode waveguide, a light intensity distribution which is symmetric with respect to the center line in comparison with that obtained at the time of incidence. Therefore, if a waveguide 13 is installed at a position (the position of distance D from the center line) symmetric with the waveguide 12 relative to the center line, the light incident from the optical waveguide 12 can be guided again through the optical waveguide 13 with little loss.

In this case, part of the reflected light is propagated reverse through the optical waveguide 12, creating a reflected return light (resulting in poor optical directivity). However, by arranging the optical waveguides 12 and 13 so that the spacing D between both waveguides takes a sufficiently large value, the reflected return light can be sufficiently diminished (resulting in good optical directivity).

In the wavelength multiplexer or optical waveguide device according to the present invention, as in this example, the length and width of the foregoing multi-mode interference type optical waveguide and the connections between the multi-mode interference optical waveguide and the first to third optical waveguides are adjusted so that, after signal lights incident from one or more of the first to third optical waveguides are propagated each as a multi-mode light through the multi-mode interference type optical waveguide, a signal light having a predetermined wavelength is coupled to one or more optical waveguides out of the first to third optical waveguides with low loss.

In the wavelength multiplexer or optical waveguide device according to the present invention, it is preferable that the length L of the above multi-mode interference type waveguide be in the range of 1 to 5 mm and the width thereof in the range of 25 to 70 µm.

In the wavelength multiplexer or optical waveguide device according to the present invention, moreover, the fourth optical waveguide is connected to the multi-mode interference type optical waveguide on the first optical waveguide side. Alternatively, plural optical waveguides other than the first to fourth optical waveguides may be connected to the multi-mode interference type optical waveguide.

Or, the wavelength multiplexer or the optical waveguide device may be in the form of an optical tresmitter module, an optical receiver module, an optical transceiver module, or an optical multiplexer module, characterized in that a light emitting element, a light receiving element, an optical fiber, or means for connection with an optical fiber is provided at end faces of all or part of the first to fourth optical waveguides.

Further, for solving the problem of optical crosstalk as the foregoing second problem, it is useful to adopt the following measure.

Firstly, the wavelength multiplexer or optical waveguide device according to the present invention is characterized in that extension lines of the optical axes of the second and third optical waveguides have an intersecting point outside the multi-mode interference type waveguide or are parallel to each other. An optical transceiver module using such a wavelength multiplexer or optical waveguide device comprises, in addition to the wavelength multiplexer or the optical waveguide device, a light receiving element, an optical fiber, or an optical fiber connecting means, which is provided as a light receiving means at both or one end face of the first or the fourth optical waveguide, and a light emitting element, an optical fiber, or an optical fiber connecting means, which is provided as a light transmitting means at both or one end face of the second or third optical waveguide. In this optical transceiver module, the foregoing optical crosstalk is well blocked since the optical filter is optimized to reflect a light which is propagated through the second and third optical waveguides and which has an incident angle close to 0°.

Secondly, the optical crosstalk has a distribution centered on a direction perpendicular to an end face of the transmission means, but since the optical waveguides used in the present invention can be bent in an arbitrary direction, the optical crosstalk can be made less influential by bending both or one of the first or the fourth optical waveguide in a direction away from the center of the aforesaid optical crosstalk distribution.

Further, the wavelength multiplexer or the optical waveguide device may be in the form of an optical waveguide module wherein it is combined with an optical element such as a light emitting or receiving element, an optical switch, an optical filter, an optical amplifier, or an optical modulator.

Or the optical waveguide module according to the present invention may use a plurality of the wavelength multiplexeres or optical waveguide devices in combination with plural optical elements such as light emitting or receiving elements, optical switches, optical filters, optical amplifiers, or optical modulators to process a plurality of signals at a time or process a signal light having plural wavelengths in plural steps.

Or these optical modules may each be combined with an electric signal processing means such as an integrated circuit or a preamplifier to afford an optical communication module.

4. BRIEF DESCRIPTION OF THE DRAWINGS

5. DESCRIPTION OF THE PREFERRED EMBODIMENTS

Figure 1:
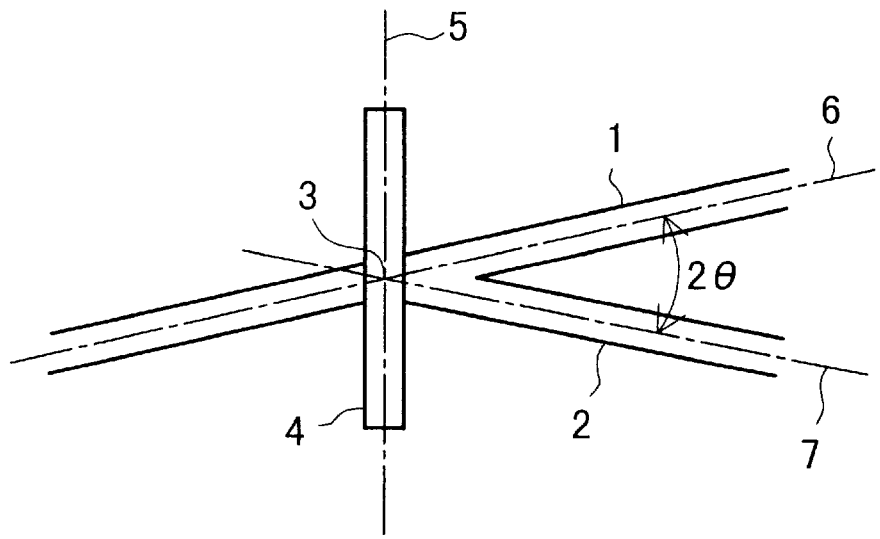
FIG. 1 is a schematic plan view of a wavelength multiplexer portion according to the prior art.

Before describing concrete embodiments of the present invention, a comparison between the present invention and the prior art will be outlined below. Main modes of the invention will be enumerated next.
(Comparison Between the Prior Art and the Present Invention)

The present invention remedies the drawback involved in the structure of an optical unit which utilizes reflection geometrically such as that described above, i.e., loss of reflected light based on a fabrication error of reflecting means.

A detailed description will now be given about the increase of loss of reflected light with reference to FIG. 2, which illustrates an optical unit of a conventional structure. A basic structure is the same as that illustrated in FIG. 1. Optical waveguides 1 and 2 are crossed and an optical filter 4 is disposed at the cross point. In this structure it is necessary to make design so that an intersecting point 3 of the optical axes of the two optical waveguides 1 and 2 which cross each other at an angle of 2θ lies on an equivalent reflection center plane 5 of the optical filter 4. In FIG. 2, the central axes of the optical waveguides 1 and 2 are indicated at 6 and 7, respectively.

It is here assumed that the angle of incidence and reflection of each optical waveguide is θ. If the optical filter 4 shifts a distance "a" in its normal line direction, the optical axis of reflected light deviates by 2|a| sin θ from an axis 7 of the reflection-side optical waveguide and becomes 7'. The position 5 indicates the position of the optical filter which is installed correctly, while the position 5' indicates the position of the optical filter which is deviated from the correct position. As a result, the reflected light does not couple well with an optical waveguide 2. Consequently, the reflected light is scattered and there occurs a large loss.

Figure 3:
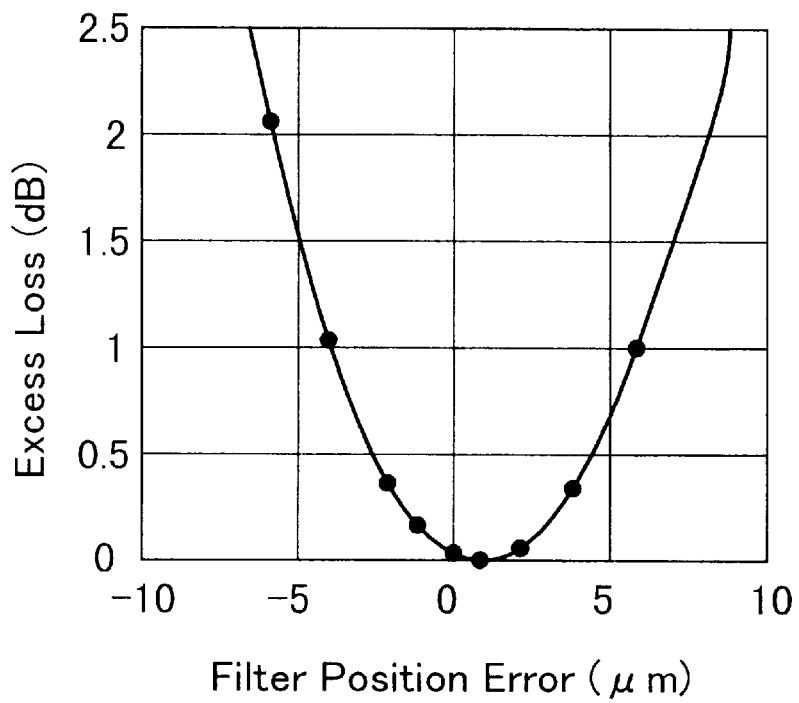
FIG. 3 is a diagram showing a relation between a positional deviation of the optical filter and an increase of loss of reflected light in the conventional wavelength multiplexer.

FIG. 3 shows an example of calculating an increase of loss of reflected light relative to the positional deviation of the optical filter. In the same figure, the axis of abscissa represents a deviation of the filter from a predetermined position, while the axis of ordinate represents an increase of loss. From the results shown in the same figure it is seen that the tolerance of the positional deviation of the optical filter is as very small as ±2 μm for suppressing the increase of loss to, say, 0.2 dB.

In installing the optical filter, however, since there is used such a machining process as grooving or cutting, it is difficult to improve the machining accuracy and actually the fabrication error in fabricating the optical filter is of a value not negligible in comparison with the optical waveguide diameter. This actual difficulty causes a lowering in production yield of the wavelength multiplexer. For this reason, in order to improve the production yield of the wavelength multiplexer using an optical waveguide with optical filter, there is a demand for such a wavelength multiplexer structure as widen the tolerance of the positional deviation of the filter.

Figure 4:
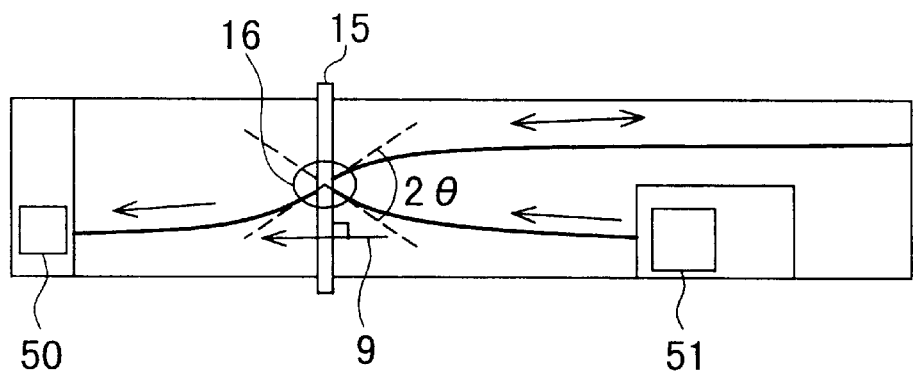
FIG. 4 is a schematic plan view showing another optical unit of a conventional configuration.

Reference will now be made to the problem of optical crosstalk. FIG. 4 is a layout plan view of an optical transceiver module, showing an example related to this problem. According to the configuration of this optical transceiver module, a photo-diode 50 and a laser diode (LD) 51 are installed for the wavelength multiplexer shown in FIG. 1, which is indicated at 16. As the optical filter 15 there is used one which reflects light of a wavelength of a transmission signal and which transmits light of a wavelength of a reception signal longer than the wavelength of the transmission signal. In the optical transceiver module there occurs the problem of crosstalk such that leak light 9 created in the transmitter section such as LD exerts an influence on the reception signal.

It is not that the whole of light generated in the LD 51 is propagated through an optical waveguide. There occurs an LD-waveguide coupling loss, whereby a portion of light emitted from the LD is scattered to the exterior of the waveguide without coupling to the waveguide. Also in a bend waveguide between the LD and the wavelength multiplexer a portion of guided light is propagated as radiation light 19 to the exterior of the waveguide, becoming leak light 9, but most of the guided light reaches the optical filter 15 at an incident angle different from θ.

Figure 5:
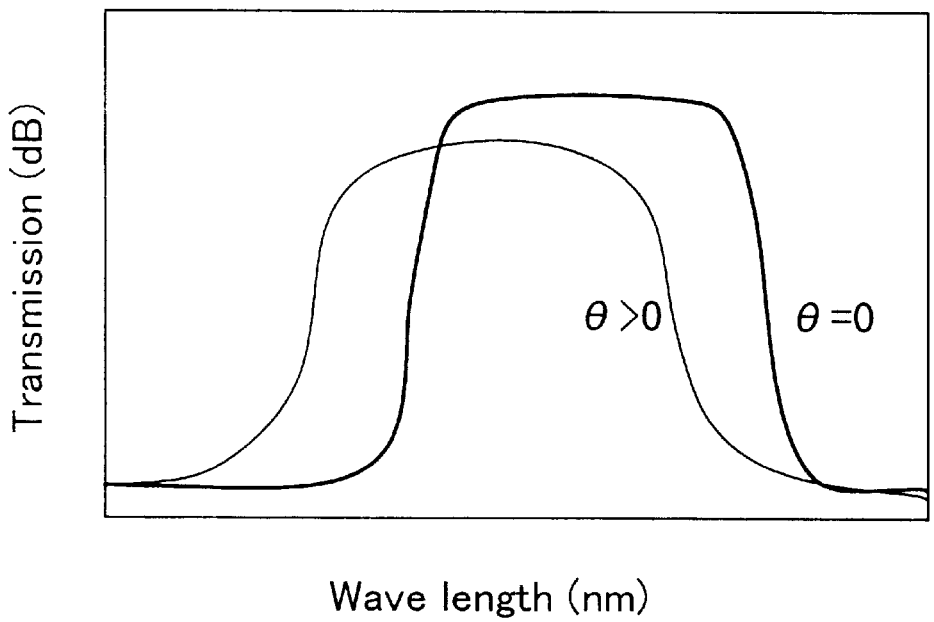
FIG. 5 is a diagram showing transmission characteristics of an optical filter for lights different in incident angle.

FIG. 5 shows an example of transmission characteristics of an optical filter with respect to both the case where the incident angle θ is zero and the case where it is larger than zero. In the characteristics of FIG. 5, the wavelength range with a large transmission loss corresponds to the wavelength range which is used for reflection. Generally, in the optical filter, as is seen from the example of FIG. 5, a different incident light angles causes a change in the reflection range and also causes deterioration of isolation.

In the foregoing example illustrated in FIG. 5 there is used an optical filter designed so as to reflect light with an incident angle of θ, which is for reflecting the light propagated through the optical waveguide. Thus, since most of the leak light is different in incident angle from the incident angle θ on the filter, light is also included therein which transmits the optical filter without being cut off. Once this transmitted leak light reaches the PD 50, it acts as noise on the received light signal, causing the reception characteristic to be deteriorated.

One countermeasure is to approximate the incident angle θ on the filter to 0°. According to this countermeasure, since the deviation between the optical axis of reflected light and the waveguide axis, which is caused by a positional deviation of the filter, is also close to zero, it is possible to diminish an increase of loss based thereon. Conversely, the incident angle of leak light becomes θ or so and thus the leak light can be intercepted by the filter.

Figure 2:
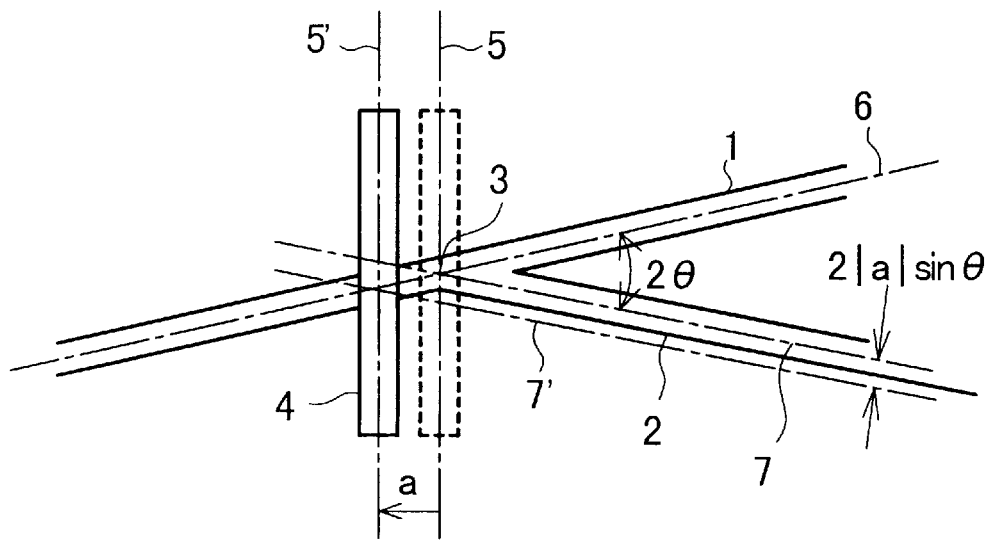
FIG. 2 is a schematic plan view explaining a displaced state of an optical filter in the conventional wavelength multiplexer.
Figure 6:
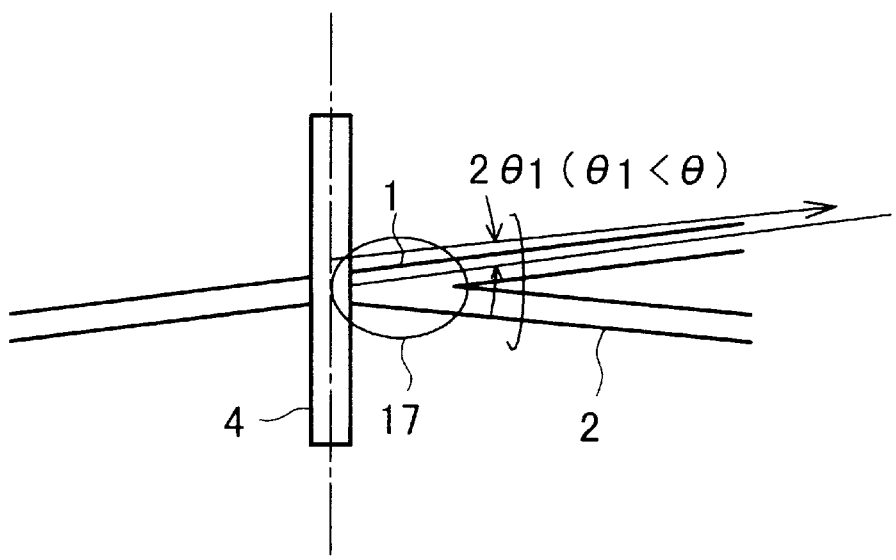
FIG. 6 is a plan view showing a wavelength multiplexer with a conventional structure in which the angle θ is set close to zero.

However, if this countermeasure is applied to the wavelength multiplexer of FIG. 1, there newly arises the problem of so-called reflected return light such that reflected light is apt to return to the incident-side optical waveguide. FIG. 6 is an explanatory diagram illustrating this problem. Practice of the above countermeasure results in an increase of an overlapped portion 17 of the two optical waveguides 1 and 2. Thus, a limit is encountered in diminishing the incident angle θ. For this reason it has so far been impossible for the incident angle diminishing method to become an effective and practical solution.

The present invention solves the above-mentioned problems. In the multi-mode interference type optical waveguide according to the present invention, as noted earlier, upon incidence of light from the incident-side optical waveguide, the vicinity of inlet of the exit-side optical waveguide forms a peak of a light intensity distribution and so there scarcely occurs any loss of the incident light.

Moreover, since the incident-side optical waveguide and the optical waveguide for guiding reflected light to the exit side, which are juxtaposed in the multi-mode interference type optical waveguide, are installed at predetermined separate positions, it is possible to eliminate the problem that the return light, which has been reflected by the filter.

Further, as will be described later, the optical filter reflects a light signal with an incident angle close to 0°, so in this structure the incident angle of light developed as leak light takes a value not permitting transmission and thus the transmission of the leak light through the filter is prevented.

Principal modes of the present invention will be described below.

(Modes of the Present Invention Having an Optical Filter)

The first mode of the present invention resides in an optical unit having optical waveguides, including at least first, second and third optical waveguides, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face of the fourth optical waveguide, and the fourth optical waveguide being an optical waveguide capable of propagating light in a multi-mode such that upon input of light having a first wavelength from either the second or the third optical waveguide, light corresponding to the light input of the first wavelength can be propagated into the first optical waveguide by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection by the optical filter.

As each of the first, second and third optical waveguides there may-be used an optical waveguide which permits the propagation of light in a single mode or multi-mode. In many of optical wavelength division multiplexing communications there is used a single mode of light and the present invention is useful particularly for this purpose.

However, also in case of using a multi-mode light it is possible to realize a convenient wavelength multiplexer function by applying the present invention. This is because the multi-mode interference type optical waveguide according to the present invention fulfill the same function for both multi-mode and single mode lights.

This mode, if exemplified as the second mode of the present invention, resides in an optical unit having optical waveguides, including at least first, second and third optical waveguides capable of propagating light in a single mode, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces of the fourth optical wave guide being end faces intersecting the light traveling direction in the fourth optical waveguide, and the fourth optical waveguide being an optical waveguide capable of propagating light in a multi-mode such that upon input of light having a first wavelength from either the second or the third optical waveguide, light corresponding to the light input of the first wavelength can be propagated in a single mode into the first optical waveguide after passing through the optical filter by the propagation of light in the fourth optical waveguide, and upon input of light having a second wavelength from either the second or the third optical waveguide, light corresponding to the light input of the second wavelength can be propagated in a single mode into a light input-free optical waveguide out of the second and third optical waveguides through reflection by the optical filter.

The third mode of the present invention resides in an optical unit having optical waveguides, including at least first, second and third optical waveguides capable of propagating light in a multi mode, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces of the fourth optical waveguide being end faces intersecting the light traveling direction in the fourth optical waveguide, and the fourth optical waveguide being an optical waveguide capable of propagating light in a multi-mode such that upon input of light having a first wavelength from either the second or the third optical waveguide, light corresponding to the light input of the first wavelength can be propagated in a multi mode into the first optical waveguide after passing through the optical filter by the propagation of light in the fourth optical waveguide, and upon input of light having a second wavelength from either the second or the third optical waveguide, light corresponding to the light input of the second wavelength can be propagated in a multi mode into a light input-free optical waveguide out of the second and third optical waveguides through reflection by the optical filter.

The fourth mode of the present invention resides in an optical unit having optical waveguides, including at least first, second and third optical waveguides, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, and the fourth optical waveguide being an optical waveguide wherein when standardized shapes of light intensity distributions for the wavelength of passing through the optical filter on two planes spaced a predetermined distance from the first and second end faces of the fourth optical waveguide are superimposed one on the other, the said shapes are in axial symmetry or approximately axial symmetry with respect to a central axis extending in the light traveling direction of the fourth optical waveguide.

The fifth mode of the present invention resides in an optical unit having optical waveguides wherein a first optical waveguide is connected to a first end face of a fourth optical waveguide permitting the propagation of light in a multi-mode, second and third optical waveguides are connected to a second end face opposed to the first end face of the fourth optical waveguide at a predetermined spacing from each other in their connected positions, an optical filter is installed in the fourth optical waveguide, and an incident plane of the optical filter is parallel or approximately parallel to the wave front of light in each of the first, second and third optical waveguides at the connected position of each of those optical waveguides connected to the fourth optical waveguide.

In connection with the multi-mode interference type optical waveguide according to the present invention, a supplementary explanation will now be given about the configuration wherein the vicinity of the exit-side optical waveguide forms a peak in the light intensity distribution upon incidence of light from the incident-side optical waveguide. From this supplementary explanation it will also be fully understood that the incident-side optical waveguide and the optical waveguide for guiding reflected light to the exit side, which are juxtaposed in the multi-mode interference type optical waveguide, are installed in predetermined individual positions and that therefore it is possible to eliminate the problem of reflected return light from the filter being mixed as noise into the optical waveguide for guiding the light to the exit side which light should be transmitted through the filter.

Figure 7:
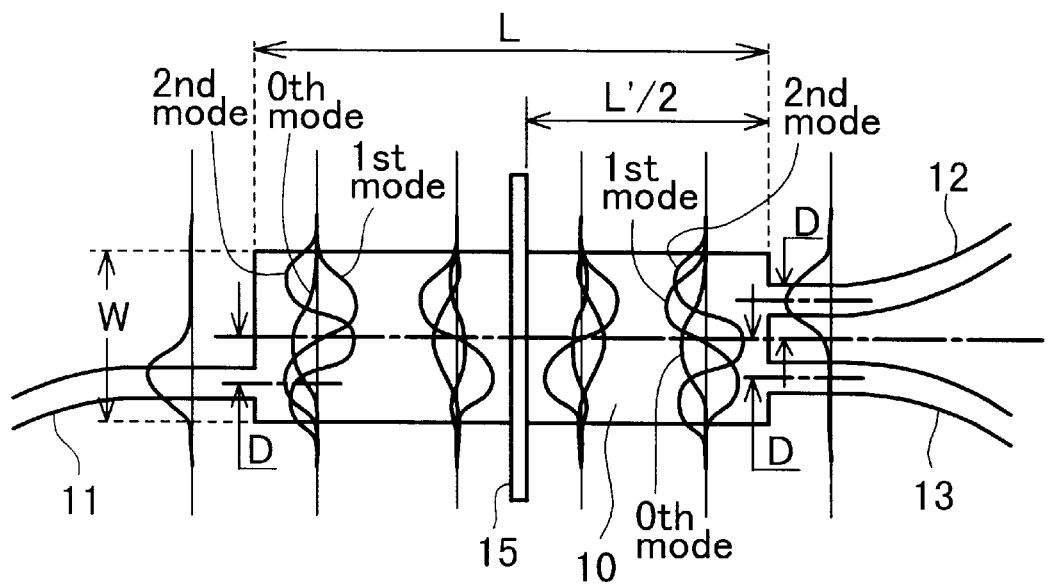
FIG. 7 is a plan view showing schematically a multi-mode interference of a wavelength multiplexer portion according to the present invention.

Reference is now made to FIG. 7 which illustrates in what state light is propagated in the multi-mode interference type optical waveguide.

It is here assumed that the wavelength of signal light is λ and the refractive index of the multi-mode interference type optical waveguide is n. The length L and width W of the multi-mode interference type optical waveguide, as well as the distance D of the central axis of an optical waveguide disposed at a junction from the central axis of the multi-mode interference type optical waveguide, are in the following relationships, in which the central axis of each optical waveguide extends in the light traveling direction:

$$L=\alpha(4nW^2)/3\lambda \quad (1)$$

$$D=\beta W/6 \quad (2)$$

where α and β stand for correction coefficients.

By satisfying the above relationships, the vicinity of inlet of the first optical waveguide 11 forms a peak in the light intensity distribution and the incident light from the optical waveguide 12 can be guided again through the optical waveguide 11 with little loss. Also as to the reflection from the optical filter 15, there can be obtained just the same reflection as in the case of the optical waveguide 11, taking a reflected image into consideration.

If the distance of the multi-mode interference type optical waveguide in the light traveling direction for transmitted light ($\lambda_1$) and that for reflected light ($\lambda_2$) are assumed to be L and L', respectively, there exists the following relationship:

$$L:L'=1/\lambda_1:1/\lambda_2 \quad (3)$$

Further, it will be seen easily that the following relationships are established:

$$L=\alpha(4nW^2)/3\lambda_1 \quad (4)$$

$$L'=\alpha(4nW^2)/3\lambda_2 \quad (5)$$

In this case, there arises the necessity of correcting the theoretical relations due to, for example, deviations from theories on concrete materials and concrete structures of cores and clads of the optical waveguides. The above α and β correspond to such correction coefficients. Usually, the correction coefficients α and β are approximately within a range of from 1 to 1.5. Anyhow, it is possible to realize an optical waveguide which satisfies the above equations (1) and (2). An actual length L of the multi-mode interference type optical waveguide is in many cases in the range of 1 to 5 mm and an actually width W thereof is in many cases in the range of 25 to 70 μm. This is as noted earlier. More practically and preferably, the length L and width W of the multi-mode interference type optical waveguide are selected in the ranges of 1.5 to 2.0 mm and 30 to 40 μm, respectively.

As to the theory of the multi-mode interference itself, reference can be made, for example, to JOURNAL OF LIGHTWAVE TECHNOLOGY, Vol. 13, NO. 4, APRIL 1995, pp. 615–627. The optical unit according to the present invention is built using this theory.

The sixth mode of the present invention resides in a wavelength multiplexer for combining or branching a signal light having plural wavelength, formed on a plane substrate and comprising a multi-mode interference type optical waveguide, a first optical waveguide connected to one side of the multi-mode interference type optical waveguide, second and third optical waveguides connected to the multi-mode interference type optical waveguide on the side opposite to the first optical waveguide, and an optical filter installed in the multi-mode interference type optical waveguide, wherein the second and third optical waveguides are spaced a predetermined distance from each other in their connections with the multi-mode interference type optical waveguide.

The seventh mode of the present invention resides in a wavelength multiplexer or an optical waveguide device, wherein an optical filter is disposed perpendicularly or approximately perpendicularly to a traveling direction (alias optical axis) of a multi-mode light guided through a multi-mode interference type optical waveguide.

In the present invention, a plurality of optical waveguides, for example the optical waveguides 12 and 13 shown in FIG. 7, are installed on one end face of the multi-mode interference type optical waveguide at predetermined individual positions. Since the optical filter is installed perpendicularly or approximately perpendicularly to the traveling direction of a multi-mode light which is guided through the multi-mode interference type optical waveguide, even if light incident from one optical waveguide, say, the optical waveguide 13 reaches the optical filter, it does not constitute a noise as leak light.

It can be said that in the present invention the length and width of the multi-mode interference type optical waveguide, as well as the connections between the multi-mode interference type optical waveguide and the first to third optical waveguides, are adjusted so that signal lights incident from at least one or more of the first to third optical waveguides out of plural optical waveguides connected to the multi-mode interference type optical waveguide are each propagated as a multi-mode light in the multi-mode interference type optical waveguide and thereafter a signal light having a predetermined wavelength is coupled to one or more of the first to third optical waveguides.

According to another mode of the present invention it is extremely convenient in practical use that extension lines of the optical axes of the second and third optical waveguides, for example the optical waveguides 12 and 13 in FIG. 7, have an intersecting point outside the multi-mode interference type optical waveguide, or are parallel or approximately parallel to each other. By so doing, for example even if light incident from the optical waveguide 13 reaches the optical filter, it does not constitute a noise as leak light. Further, each of the optical waveguides is employable in a bent state in an arbitrary direction, whereby each optical waveguide is bent from the leak light distribution area to suppress the generation of noise. This advantage facilitates the design of a larger optical system.

In a further mode of the present invention, the fourth optical waveguide is connected to the multi-mode interference type optical waveguide on the first optical waveguide side, or plural other optical waveguides than the first to fourth optical waveguides are connected to the multi-mode interference type optical waveguide. Thus, various applications are conceivable according to concrete purposes of use.

In a still further mode of the present invention, light emitting or receiving elements, optical fibers, or optical fiber connecting means may be provided on end faces of all or part of the first to fourth optical waveguides. In this way there can be obtained a desired optical transmitter or receiver module, an optical transceiver module, or a wavelength multiplexer module, concrete examples of which will be described later. Instead of the first to fourth optical waveguides, such light emitting or receiving elements may be connected directly to the multi-mode interference type optical waveguide. This is desirable because the absorption of light by intervening optical waveguides can be avoided. Of course, such light emitting or receiving elements may be connected through different optical waveguides to the multi-mode interference type optical waveguide.

A typical example of the present invention resides in an optical unit having optical waveguides, including at least first, second and third optical waveguides, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces being end faces intersecting the light traveling direction in the fourth optical waveguide, the fourth optical waveguide being an optical waveguide capable of propagating light in a multi-mode such that upon input of light having a first wavelength from either the second or the third optical waveguide, light corresponding to the light input of the first wavelength can be propagated into the first optical waveguide after passing through the optical filter by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection by the optical filter, and a light emitting unit or a light receiving unit is provided, the light emitting unit or the light receiving unit being connected to at least one of the first to third optical waveguides, or a light emitting unit or a light receiving unit is provided instead of at least one of the first to third optical waveguides.

Also in the case of the optical transceiver module using such a wavelength multiplexer or optical waveguide device, leak light can be intercepted by a configuration wherein the wave front of leak light as part of a transmission signal produced by the transmitter means and propagating through the exterior of the optical waveguide connected to the transmitter means is parallel or approximately parallel to a plane formed by the optical filter.

Thus, it can be said that a typical example of the above configuration is an optical transceiver module comprising a wavelength multiplexer or an optical waveguide device, a light receiving element, an optical fiber, or an optical fiber connecting means provided as a light receiving means on both or one end face of the first or the fourth optical waveguide, and a light transmitting element, an optical fiber, or an optical fiber connecting means provided as a transmission means on both or one end face of the second or the third optical waveguide, wherein the wave front of leak light as part of a transmission signal produced by the transmitter means and propagating through the exterior of the optical waveguide connected to the transmitter means is parallel or approximately parallel to a plane formed by the optical filter and is thereby intercepted.

According to a still further mode of the present invention, an optical transmitter module, an optical receiver module, an optical transceiver module, or a wavelength multiplexer is provided, for more useful interception of leak light, with one or more other optical filters than the foregoing optical filter or one or more waveguides, waveguide layers, or members different in refractive index from the clad, other than the first to fourth optical waveguides and the aforesaid plural waveguides.

Further, the wavelength multiplexer or optical waveguide device according to the present invention may be combined with, for example, any of such optical elements as light emitting element, light receiving element, optical switch, optical filter, optical amplifier, and optical modulator.

Further, plural wavelength multiplexers or optical waveguide devices related to the present invention may be combined with plural optical elements selected, for example, from light emitting element, light receiving element, optical switch, optical filter, optical amplifier, and optical modulator, whereby plural signals can be processed at a time, or a signal light having plural wavelengths can be processed in plural steps.

Further, optical modules related to the present invention may be combined with an electric signal processing means such as an integrated circuit or a pre-amplifier to afford optical communication modules or optical communication systems.

(Modes of the Present Invention not Having an Optical Filter)

Figure 20:
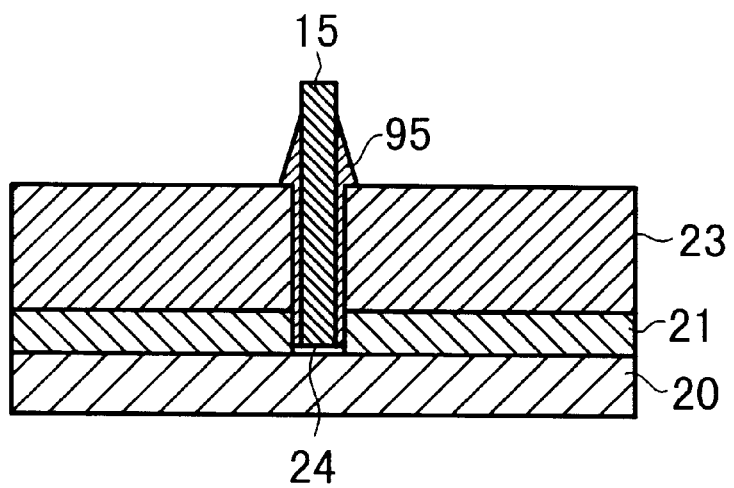
FIG. 20 is a sectional view showing installation of an optical filter.

The optical unit having optical waveguides described above, but in a form prior to installation of the optical filter, is also an important mode of the present invention. Of course, it goes without saying that an optical filter having predetermined characteristics is needed for using the optical unit as a wavelength multiplexer, an optical transmission module, an optical reception module, or an optical transmission/reception module. However, for actually using the optical unit having optical waveguides according to the present invention, it is practical to first provide the optical unit in an optical filter-free form and then install the optical filter therein. FIG. 20 is an enlarged sectional view showing a state in which an optical filter 15 has been installed on a substrate 20. In the example illustrated in FIG. 20, first and second clad layers 21 and 23 are formed on the substrate 20 and a slot 20 for insertion of the filter therein is formed. The filter 15 is fixed with an adhesive layer 95. This sectional view is of a portion not including a core area.

Thus, it can be said that a typical example of the mode in question resides in an optical unit having optical waveguides, including at least first, second and third optical waveguides, a fourth optical waveguides capable of propagating light in a multi-mode, and means for installing an optical filter in the fourth optical waveguide perpendicularly to a traveling direction of light in the fourth optical waveguide, the first optical waveguide being connected to a first end face of the fourth optical waveguide, the second and third optical waveguides being connected to predetermined individual positions of a second end face o f the fourth optical waveguide, and the fourth optical waveguide being an optical waveguide permitting the propagation of light in a multi-mode such that upon input of light having a first wavelength from either the second or the third optical waveguide, light corresponding to the light input of the first wavelength, can be propagated into the first optical waveguide by the propagation of light in the fourth optical waveguide, and upon input of light having a second wavelength from either the second or the third optical waveguide, light corresponding to the light input of the second wavelength can be propagated into a light-free optical waveguide out of the second and third optical waveguides through reflection by the optical filter.

Embodiments of the Invention

Figure 8:
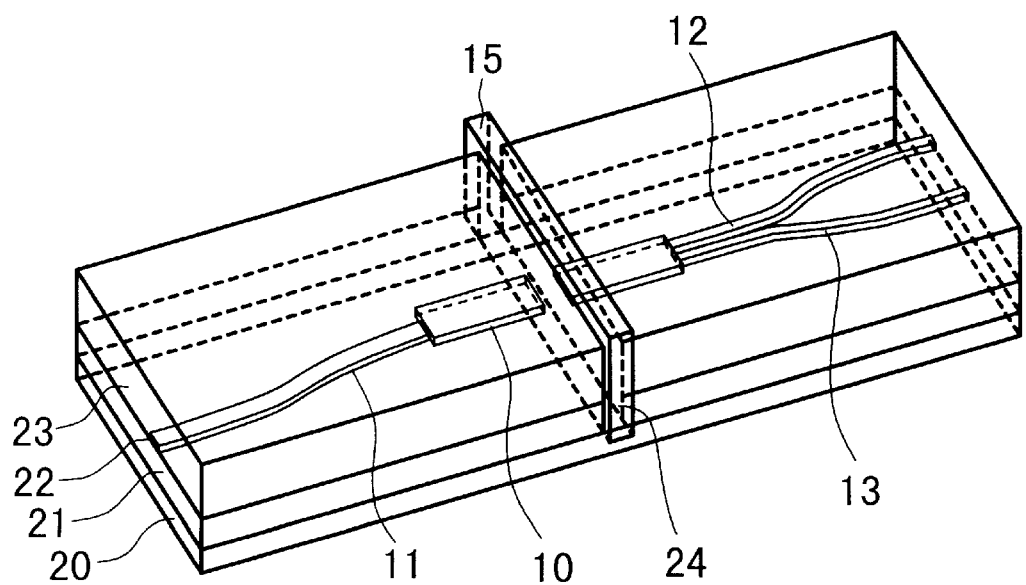
FIG. 8 is a perspective view showing a wavelength multiplexer portion according to the first embodiment of the present invention.
Figure 9:
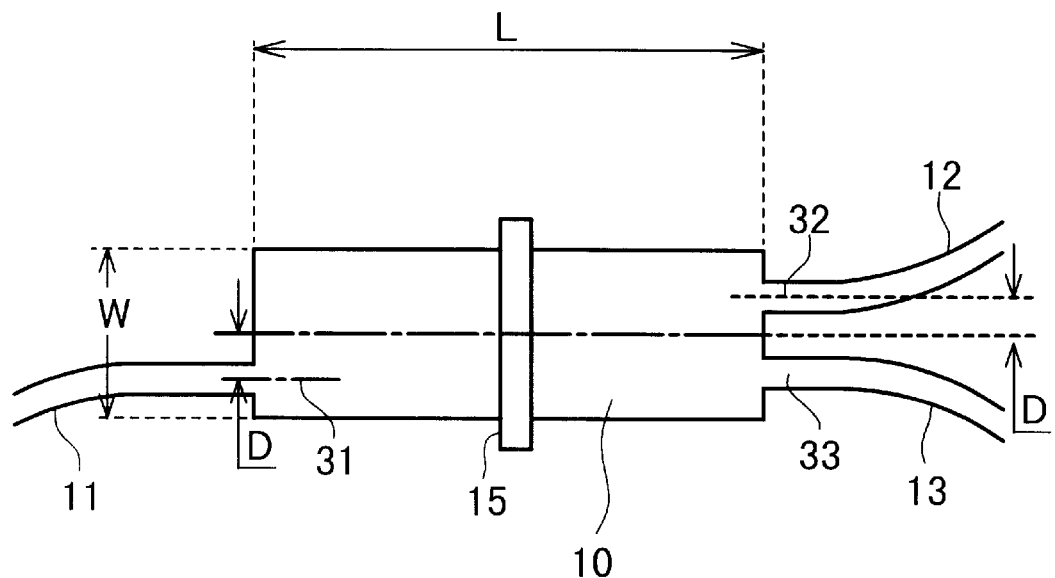
FIG. 9 is an enlarged plan view thereof.

FIG. 8 is a perspective view showing a wavelength multiplexer according to the first embodiment of the present invention and FIG. 9 is an enlarged plan view of a wavelength combining/branching section thereof.

An optical waveguide is formed on a predetermined substrate, say, a silicon (Si) substrate 20, using two kinds of fluorinated polyimide resins different in refractive index. This optical waveguide includes at least a first clad layer 21, a core area 22, and a second clad layer 23. The numeral 24 denotes a slot for insertion of a filter therein. For example, the first, or lower, clad layer 21, the core 22, and the second, or upper, clad layer 23 are 5 82 m, 6.5 $\mu$m, and 15 $\mu$m, respectively, in thickness. A core to clad refractive index ratio is set at 0.3%. The wavelength combining/branching section includes at least a multi-mode interference type optical waveguide 10, a first optical waveguide 11, a second optical waveguide 12, and a third optical waveguide 13. The width W and length L of the multi-mode interference type optical waveguide, and an optical waveguide to optical waveguide spacing D, are 25 $\mu$m, 1200 $\mu$m, and 5 $\mu$m, respectively. Further, the three optical waveguides are each 6.5 $\mu$m wide.

As the optical filter 15 is used a dielectric multi-layer filter 15 which reflects light incident at an incidence angle of 0° and having a wavelength of 1.3 $\mu$m and which transmits light having a wavelength of 1.5 $\mu$m. The thickness of the filter 15 is 15 $\mu$m . The dielectric multi-layer filter itself may be a conventional one. The filter was inserted into the slot 24 of 15 $\mu$m width centrally of the multi-mode interference type optical waveguide and was fixed using an UV (Ultra-Violet) curing agent 95. For example, the slot 24 can be formed using a dicing saw. The second and third optical waveguides 12, 13 are parallel or approximately parallel to each other in their connections 32 and 33 with the multi-mode interference waveguide.

FIG. 20 illustrates the optical filter 15 as mounted on the substrate 20, as a sectional view. The numeral 24 denotes a slot for inserting the filter as a reflecting means therein. Numerals 21 and 23 denote clad layers of the optical waveguides. An adhesive 95 was used for fixing the reflecting means 15.

In FIGS. 10, 14, 15 and 16 there are shown laminate structures of optical waveguides similar to FIG. 8. However, as to the structure itself of each of such optical waveguides, a conventional structure will do. Therefore, a detailed explanation of each of the laminate structures will be omitted.

The second and third optical waveguides 12, 13 are parallel to each other in their connections 32 and 33, whereby the optical axis of a multi-mode light excited in the multi-mode interference type optical waveguide becomes perpendicular to the optical filter. As a result, even if a positional deviation of the filter 15 should occur, there never occurs a deviation between the optical axis of reflected light from the filter 15 and an optical waveguide axis.

Figure 10:
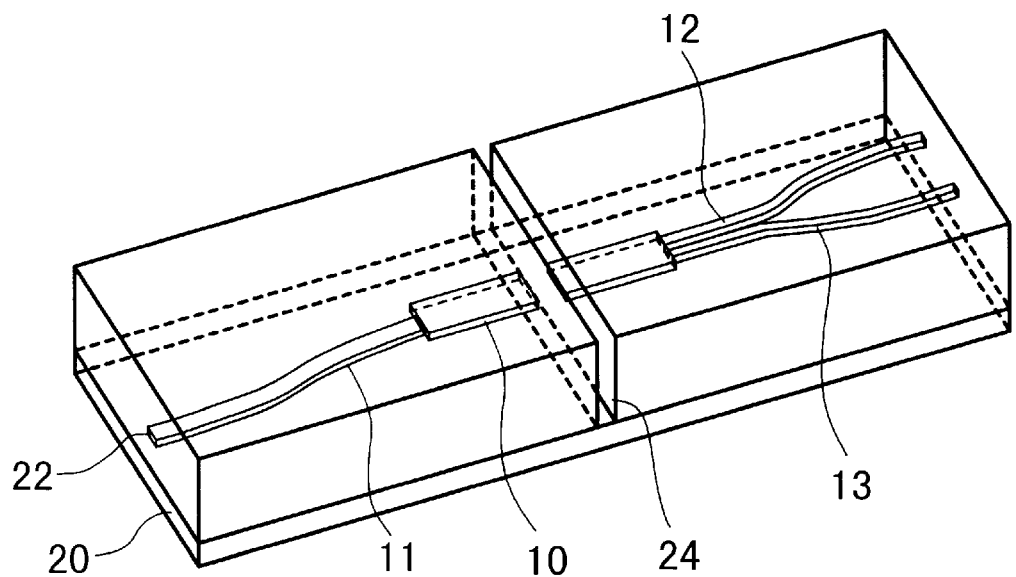
FIG. 10 is a perspective view of an optical unit prior to installation of an optical filter.

The optical filter is not limited to the dielectric multi-layer filter. For example, it may be such an optical waveguide device as shown in FIG. 10 which is provided with only an optical filter mounting means such as the dicing slot 24. Other components in FIG. 10 are the same as in FIG. 8 and therefore a detailed description thereof will be omitted.

The optical unit having optical waveguides according to the present invention may also be in such a form as having a plurality of optical waveguides as inputs to the wavelength multiplexer and plural optical waveguides as outputs from the wavelength multiplexer. It goes without saying that all of such plural optical waveguides are of a single mode and that the wavelength multiplexer has a multi-mode interference type optical waveguide.

Figure 11:
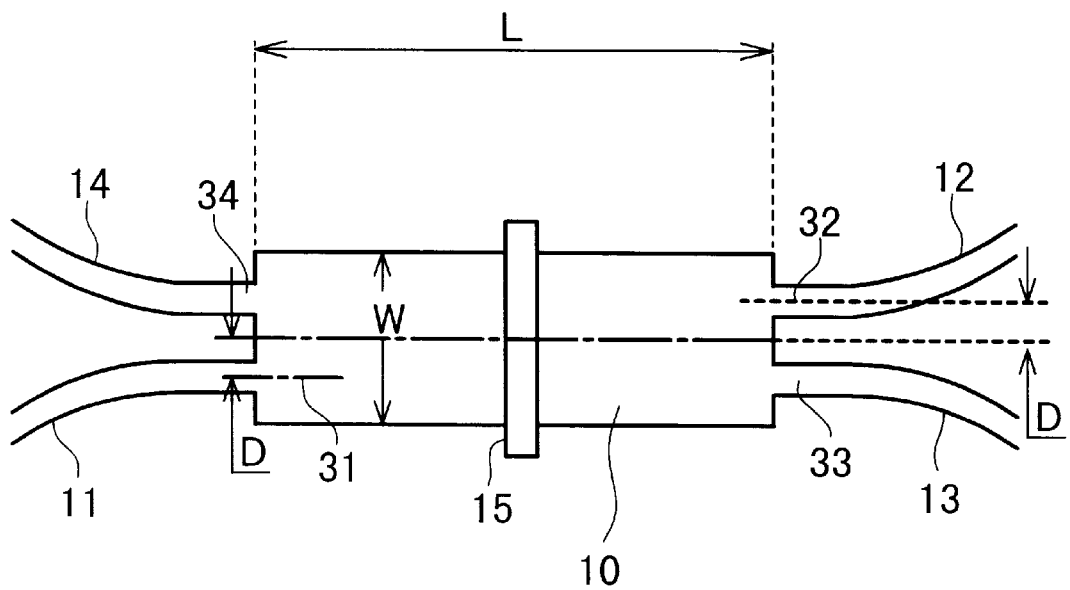
FIG. 11 is an enlarged plan view thereof.

FIG. 11 is a plan view of a wavelength multiplexer portion, showing an example of the mode just described above. In this example, plural, more specifically two, optical waveguides 12 and 13 are disposed on an incident side of a multi-mode interference type optical waveguide 10. On the other hand, on an exit side of the multi-mode interference type optical waveguide 10 are disposed plural, more specifically two, optical waveguides 11 and 14. FIG. 11 is the same as FIG. 9 except that a fourth optical waveguide 14 is disposed at a position identified by the reference numeral 34, and therefore the same portions and components as in FIG. 9 are identified by the same reference numerals as in FIG. 9.

It is needless to say that a plurality of further optical waveguides may be connected to the multi-mode interference type optical waveguide to constitute plural wavelength multiplexers.

A comparison will be made below between the wavelength multiplexer of the structure according to the present invention and that of the conventional structure shown in FIG. 1 with respect to the manufacturing tolerance related to the filter portion.

Figure 12:
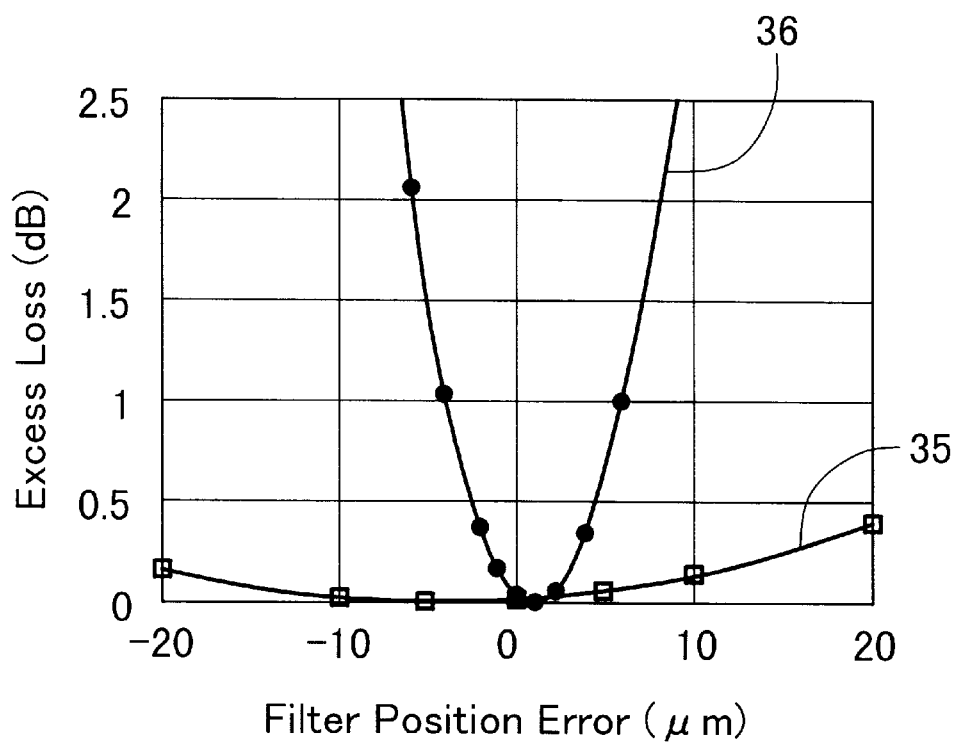
FIG. 12 is a diagram showing a relation between a positional deviation of a filter and the amount of loss of reflected light with respect to both the wavelength multiplexer portion according to the first embodiment of the invention and that of the conventional structure.

FIG. 12 shows a loss increase quantity of reflected light caused by a positional deviation of the filter, in which the distance of a positional deviation of the filter is plotted along the axis of abscissa, while an example of a loss increase quantity of reflected light is plotted along the axis of ordinate. Curved lines 35 and 36 represent characteristics obtained respectively in this embodiment and in the conventional structure. Assuming that a loss which is allowable in design is, say, 0.2 dB, the tolerance is 2 $\mu$m in the conventional structure, while the tolerance in this embodiment is about 10 μm. Thus, according to this embodiment it is possible to attain a sufficiently large manufacturing tolerance in comparison with the conventional structure.

It is to be noted that the increase of loss caused by a positional deviation of the filter in this example is attributable not to a deviation between the optical axis of reflected light and an optical waveguide axis but to an intensity distribution based on the interference of a multi-mode light in the multi-mode interference type optical waveguide.

Figure 13:
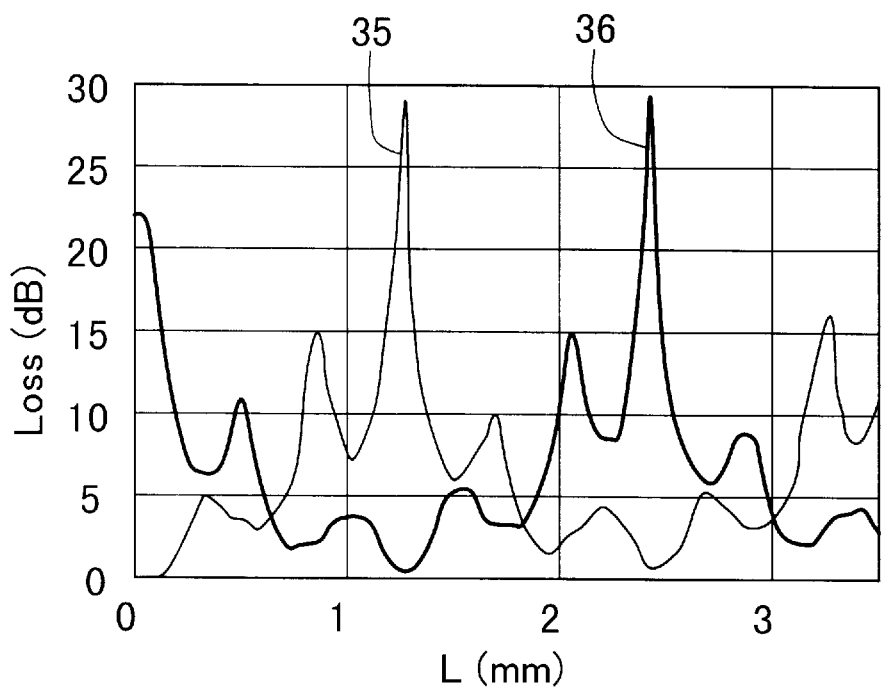
FIG. 13 is a diagram showing a relation between the length of a multi-mode interference type optical waveguide and light intensity.

FIG. 13 shows a change in intensity (loss) caused by a change in length L of the multi-mode interference type optical waveguide, in which the axis of abscissa represents the length L of the multi-mode interference type optical waveguide and the axis of ordinate represents a loss. Curved lines 35 and 36 represent loss quantities of a single-mode light incident from the second optical waveguide 12 in FIG. 11 respectively in connections 31 and 34 between the first and fourth optical waveguides 11, 14 and the multi-mode interference type optical waveguide. It is seen that intensity peaks of both curved lines appear periodically at 2400 μm or so.

It follows that the loss attributable to the intensity distribution based on the interference of a multi-mode light in the multi-mode interference type optical waveguide, which is illustrated in FIG. 13, is included in the increase of loss caused by a positional deviation of the filter shown in FIG. 12. As the loss cycles, the proportion of the loss attributable to the intensity distribution based on the interference of a multi-mode light becomes high relative to the increase of loss caused by a positional deviation of the filter. In the example according to the present invention there basically is no loss based on miss-alignment of reflected light axis and the increase of loss caused by a positional deviation of the filter depends on the loss which is attributable the intensity distribution based on the interference of a multi-mode light.

Reference will be made below to application examples of the optical unit having optical waveguides according the present invention to a wavelength-division-multiplex communication.

Figure 14:
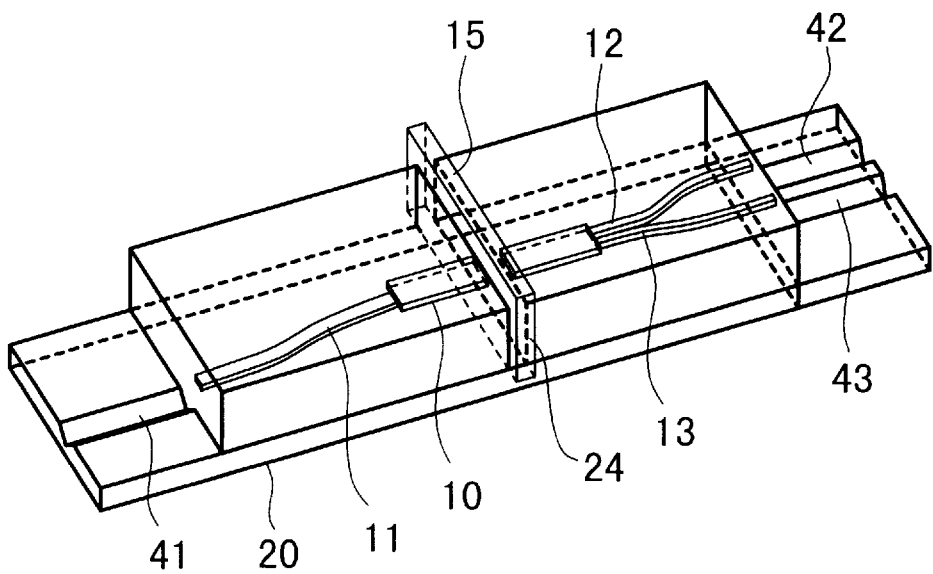
FIG. 14 is a perspective view showing a wavelength multiplexer module according to the second embodiment of the present invention.

FIG. 14 is a perspective view of a wavelength multiplexer module according to the second embodiment of the present invention. In this second embodiment, V grooves 41, 42 and 43 for installing optical fibers therein are formed respectively for end faces of the three optical waveguides used in the wavelength multiplexer illustrated above as the first embodiment. The V grooves 41, 42 and 43 can be formed easily in a silicon substrate 20 with use of the conventional anisotropic wet-etching technique. These grooves are extremely useful for establishing the positions of optical fibers.

For example, this embodiment may be applied as follows.

A study will now be made about the case where an optical filter which transmits light with a wavelength of 1.3 μm and which reflects light with a wavelength of 1.5 μm, is used as an optical filter 15. A multi-wavelength light having wavelengths of 1.3 μm and 1.5 μm is incident from an optical fiber set on the V-groove 42. In this multi-wavelength light, the light 1.3 μm in wavelength is transmitted through the optical filter 15, while the light 1.5 μm in wavelength is reflected by the optical filter. Consequently, the transmitted light 1.3 μm in wavelengh is incident on an optical fiber set on the V-groove 41. On the other hand, the reflected light 1.5 μm in wavelength is incident on an optical fiber set on the V groove 43. In this way, signal lights having the wavelengths of 1.3 μm and 1.5 μm can be branched to the optical fibers set on the V-grooves 41 and 43, respectively.

It goes without saying that the function as a light combining filter can be obtained by reversing incidence and exit.

The optical fiber connecting means is not limited to V grooves. There may be adopted another means; for example, a connecting base may be provided on a waveguide substrate and bonded to optical fibers with an adhesive.

Figure 15:
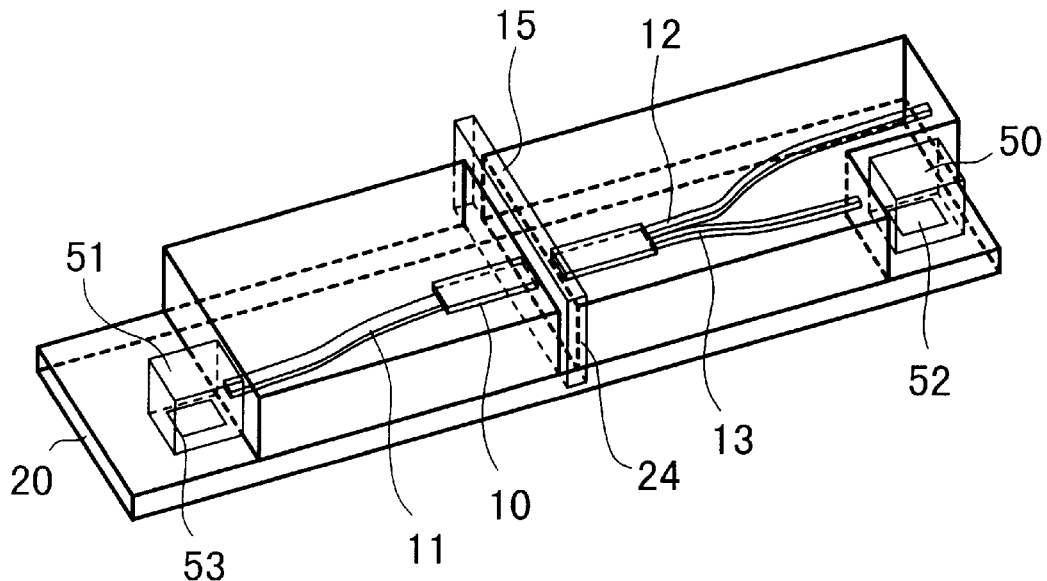
FIG. 15 is a perspective view showing an optical transceiver module according to the third embodiment of the present invention.

FIG. 15 is a perspective view of an optical transceiver module according to the third embodiment of the present invention. This embodiment shows an example in which, in an optical unit having optical waveguides according to the present invention both light emitting element and light receiving element are mounted on a single substrate. This configuration is easy to use and useful as a practical mode of an optical transceiver.

In this third embodiment, a photo-diode 51 as a light receiving element and a laser diode 50 as a light emitting element are mounted on the silicon substrate 20 of the wavelength multiplexer described in the previous first embodiment. More specifically, on the silicon substrate 20 is formed a multi-layer film of polymer as is the case with the previous embodiments. Then, the polymer is removed at predetermined portions, allowing the Si substrate 20 to be exposed at the predetermined portions. The conventional dry-etching technique will do for the removal of the polymer. First electrodes 52 and 53 of the light emitting and receiving elements are formed at predetermined positions on the silicon substrate. Further, the photo-diode 51 and the laser diode 50 are mounted on end faces of the first and third optical waveguides, respectively. The electrodes and the light emitting and receiving elements were connected together using solder. In FIG. 15, second electrodes of the light emitting and receiving elements are omitted. Other constructional points are the same as in the first embodiment and therefore the same portions and components as in the first embodiment are identified by the same reference numerals as in the first embodiment.

Figure 16:
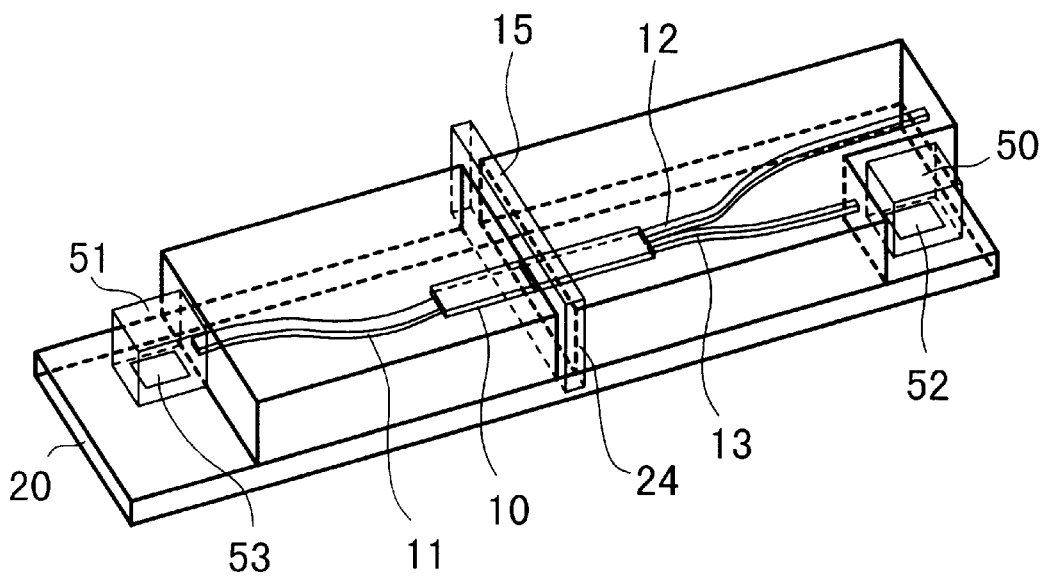
FIG. 16 is a perspective view showing another example thereof.

FIG. 16 is a perspective view of an optical transceiver module according to the fourth embodiment of the present invention. This fourth embodiment is the same as the previous third embodiment except that the photo-diode 51 is shifted to the optical waveguide 12 side with respect to the multi-mode waveguide 10 and that the bend direction of the optical waveguide 11 is changed. According to this modification, the receiver section shifts away from the distribution center of leak light which has been incapable of being coupled with the optical waveguide 13 after generated in the laser diode 50, whereby it is possible to diminish the influence of the leak light.

How to install the photo-diode and the laser diode is not limited to the method of combination adopted in this embodiment. Of course, even the mode wherein only one of the light emitting element and the light receiving element is mounted on the silicon substrate is also employable, depending on the purpose of use. Where required, there also may be adopted a mode wherein three or more light emitting elements and three or more light receiving elements are mounted on the silicon substrate.

An example will be given below of the case where the optical unit having optical waveguides according to the present invention is applied to an optical amplifier.

Figure 17:
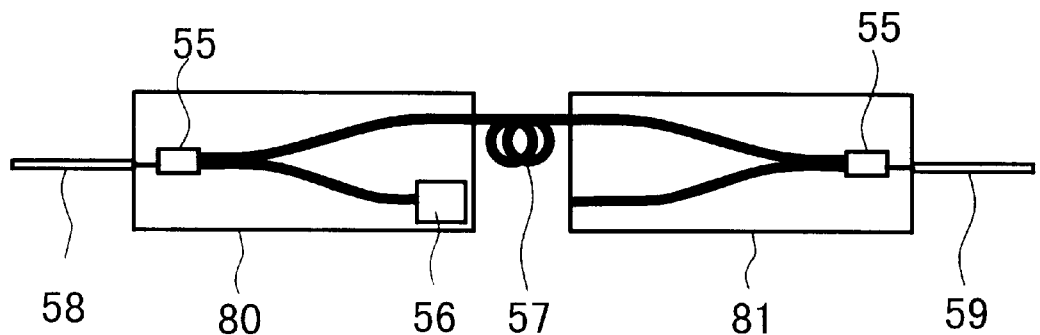
FIG. 17 is a schematic plan view showing an optical waveguide module according to the fourth embodiment of the present invention.

FIG. 17 is a plan view showing the configuration of an optical amplifier according to the fourth embodiment of the present invention. Wavelength multiplexers 55 are formed on two Si substrates 80 and 81, respectively, and a pumping laser diode 56 is installed on one Si substrate 80. The wavelength multiplexers 55 may be constituted as in the previous first embodiment. The two substrates were connected together using an Er-doped fiber (also designated a fiber amplifier) 57 which is about 1 m long.

Light incident from an optical fiber 58 combines with light different in wavelength emitted from the laser diode 56 and the thus-combined light is amplified by the Er-doped optical fiber 57. The amplified light is again branched into different wavelength components and light having a desired wavelength is outputted from an optical fiber 59. In this way the light incident from the fiber 58 is amplified and the amplified light having a desired wavelength can be obtained from the fiber 59.

Further, an example will be given below of the case where the optical unit having optical waveguides according to the present invention is applied to an optical receiver module.

Figure 18:
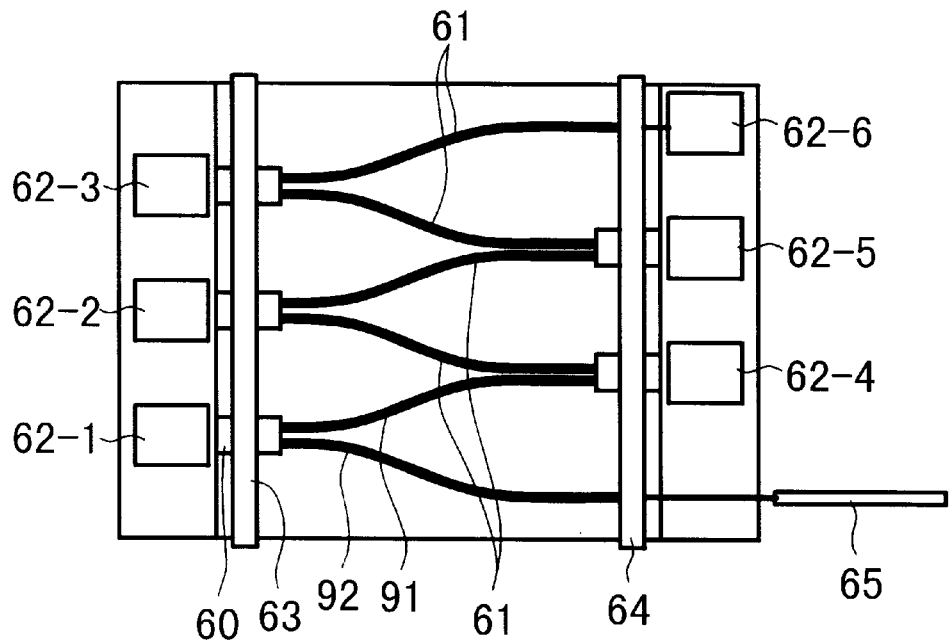
FIG. 18 is a schematic plan view showing an optical receiver module according to the fifth embodiment of the present invention

FIG. 18 is a plan view showing a basic configuration of an optical receiver module according to the fifth embodiment of the present invention. In this optical reception module to which the invention is applied, a multi-wavelength signal light is branched wavelength by wavelength and the thus-branched signal lights are received by light receiving elements suitable for the respective wavelengths.

According to a basic configuration of this embodiment, a light signal provided from an optical fiber 65 is filtered into desired wavelengths by two filters 63 and 64 and selected wavelengths of lights are detected by light receiving elements 62-1, 62-2, 62-3, 62-4, 62-5 and 65-6 which are disposed on the transmission sides of the filters.

Referring to FIG. 18, plural wavelength multiplexers 60 and optical waveguides 61 which connect them are formed on a silicon substrate as is the case with previous examples, and plural photo-diodes 62-1, 62-2, 62-3, 62-4, 62-5 and 62-6 are disposed on transmission-side end faces of the wavelength multiplexers. One end faces of the optical waveguides 61, i.e., incident light waveguides, are connected to the optical waveguide 65, which waveguide 65, e.g., an optical fiber, guides a light input to the optical receiver module. For example, the wavelength multiplexers may be of the structure described in the first embodiment. In the illustrated example, the light receiving element 62-1 is provided directly on one end face of a multi-mode interference type optical waveguide 90. A basic configuration of an optical unit according to the present invention comprises a multi-mode interference type optical waveguide 90, an optical filter 63 disposed within the waveguide 90, and optical waveguides 91 and 92 disposed on one end face of the waveguide 90. In the example shown in FIG. 18, six optical units according to the invention are connected vertically. In FIG. 18, only the optical waveguides 91 and 92 are indicated by the individual reference numerals and the other optical waveguides are indicated by the reference numeral 61 for the convenience of explanation, but all of these optical waveguides are basically the same.

The optical filter 63 or 64 is constituted in a physical form common to plural optical units, provided the optical filters 63 and 64 used are of the type which undergoes changes in reflecting and transmitting wavelength characteristics according to positions. The optical filter 63 and 64 are each designed so that the reflecting and transmitting characteristics thereof in the position corresponding to the wavelength multiplexer 60 permit transmission of a desired wavelength in the optical unit concerned. A concrete example of an optical filter which undergoes changes in its reflecting and transmitting characteristics is an optical filter wherein the spacing between two surfaces as incident and transmission surfaces of the filter is changed. Alternatively, a different filter material may be used in a predetermined position of the filter. Although in this embodiment there are used two optical filters whose reflecting and transmitting characteristics vary according to places, there may be used plural optical filters having characteristics corresponding respectively to desired places. In this case, the characteristics of each optical filter can be attained also by changing the thickness thereof.

In the module of this embodiment, a multi-wavelength signal light incident from an optical fiber is branched successively wavelength by wavelength in the wavelength multiplexers and the branched wavelengths of lights can be received by the photo-diodes respectively.

Reference will be made below to an optical communication module capable of transmission and reception of light according to the sixth embodiment of the present invention.

Figure 19:
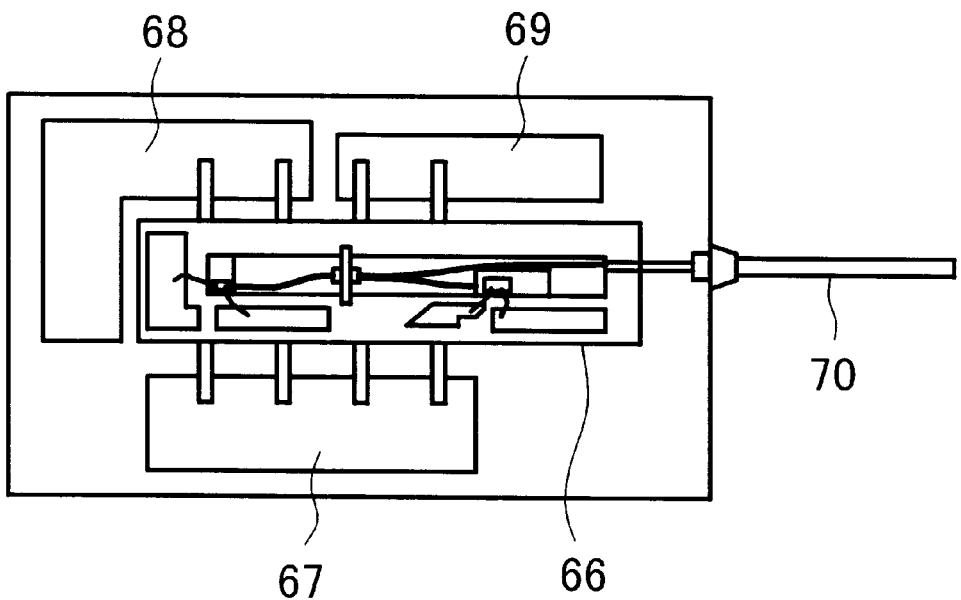
FIG. 19 is a diagram showing the layout of components of an optical communication unit according to the sixth embodiment of the present invention.

FIG. 19 is a schematic plan view showing a basic layout of principal components of the optical communication module according to the sixth embodiment. The structure described in the previous third embodiment is used for an optical transceiver module 66. An IC 67 for transmission, an IC 68 for reception, and Peltier element (thermo-electric cooler) 69 for controlling temperature are combined together in the optical communication module of this embodiment. According to this module, a light signal received from an optical fiber 70 can be converted to a digital electric signal and a generated electric signal can be transmitted as a light signal through the same optical fiber. Although in this embodiment separate ICs are used for transmission and reception, respectively, both may be rendered integral with each other, or conversely an amplifier and an APC (auto power control) may be installed in a separate manner.

Although in the above embodiments of the present invention reference has been made particularly to fabricating a wavelength multiplexer using a fluorinated polyimide on an Si substrate or a module including the wavelength multiplexer, the material of the substrate, as a matter of course, may not be limited to Si, but may be another material, e.g., silica, and the optical waveguides may be formed using any other material than the fluorinated polyimide, e.g., another polymer or silica.

Although in the above embodiments of the present invention reference has been made particularly to fabricating a wavelength multiplexer using an optical filter which transmits light having a wavelength of 1.3 $\mu$m and which reflects light having a wavelength of 1.5 $\mu$m, or a module including the wavelength multiplexer, the optical filter may be one different in wavelength characteristics. In this case, it is needless to say that a multi-wavelength light having other wavelengths can be combined and branched.

As set forth in detail hereinabove, the present invention is concerned with a wavelength multiplexer using a multi-mode intereference type optical waveguide in its reflecting structure, or an optical transmission/reception module using the wavelength multiplexer. Incident and reflective waveguides in the wavelength multiplexer are characterized by being parallel to each other in their connections with the multi-mode interference type optical waveguide.

As a result, the increase of loss caused by a positional deviation of the filter is attributable to only the cycle of interference in the multi-mode interference type optical waveguide, and the manufacturing tolerance in the filter section becomes large, with consequent improvement of the manufacturing yield and reduction of cost. Besides, since it is possible to use a filter with a reflection angle of 0°, leak light is intercepted to a satisfactory extent and the problem of optical crosstalk is solved. Consequently, there arise a margin in a loss design related to, for example, the reception sensitivity of the light receiving element.

According to the above embodiments of the present invention, fully stable optical transmission characteristics can be imparted to an optical unit having optical waveguides in a less expensive manner.

Moreover, according to the above embodiments of the present invention it is possible to provide an optical unit having optical waveguides in a high manufacturing yield.

Further, according to the above embodiments of the present invention it is possible to prevent leak light between optical waveguides disposed on opposed end faces of a multi-mode interference type optical waveguide.

The following are technical matters related to the embodiments of the present invention.

1. An optical unit having optical waveguides, including at least first, second and third optical waveguides, a fourth optical waveguide capable of propagating light in a multi-mode, and means for installing an optical filter perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces of the fourth optical waveguide being end faces intersecting the traveling direction of light in the fourth optical waveguide, and the fourth optical waveguide being an optical waveguide capable of propagating light in a multi-mode such that upon input of light having a first wavelength from either the second or the third optical waveguide, light corresponding to the light input of the first wavelength can be propagated into the first optical waveguide by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection in the position of the optical filter.

2. An optical unit having optical waveguides, including at least first, second and third optical waveguides, a fourth optical waveguide capable of propagating light in a multi-mode, and means for installing an optical filter perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the fourth optical waveguide being an optical waveguide wherein when standardized shapes of light intensity distributions on two planes spaced a predetermined distance from the first and second end faces of the fourth optical waveguide are superimposed one on the other, the said shapes are in axial symmetry or approximately axial symmetry with respect to a central axis extending in the light traveling direction of the fourth optical waveguide, and the first, second and third optical waveguides being capable of propagating light in a single mode.

3. A wavelength multiplexer including at least first, second and third optical waveguides, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces of the fourth optical waveguide being end faces intersecting the traveling direction of light in the fourth optical waveguide, the fourth optical waveguide being an optical waveguide capable of propagating light in a multi-mode such that upon input of light having a first wavelength from either the second or the third optical waveguide, light corresponding to the light input of the first wavelength can be propagated into the first optical waveguide after passing through the optical filter by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection by the optical filter, and a light receiving unit connected to either the first optical waveguide which permits the propagation of light corresponding to the light input of the first wavelength is installed at a position deviated from a central position of a distribution of leak light leaking from the optical element which performs the light input.

4. An optical waveguide module including at least first, second and third optical waveguides, a fourth optical waveguide capable of propagating light in a multi-mode, and an optical filter disposed perpendicularly to a traveling direction of light in the fourth optical waveguide, the first optical waveguide being connected to a first end face of the fourth optical waveguide, the second and third optical waveguides being connected to predetermined individual positions of a second end face opposed to the first end face of the fourth optical waveguide, the first and second end faces of the fourth optical waveguide being end faces intersecting the traveling direction of light in the fourth optical waveguide, the fourth optical waveguide being an optical waveguide capable of propagating light in a multi-mode such that upon input of light having a first wavelength from either the second or the third optical waveguide, light corresponding to the light input of the first wavelength can be propagated into the first optical waveguide after passing through the optical filter by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection by the optical filter, and at least one of the first to third optical waveguides is connected to or substituted by a light emitting unit or a light receiving unit or is combined with such an optical device as an optical switch, an optical filter, an optical amplifier, or an optical modulator.

5. An optical communication system constituted by a combination of the optical waveguide unit described in the above 4 and an electric signal processing means such as an integrated circuit or a preamplifier.

What is claimed is:

1. A wavelength multiplexer including at least:

first, second and third optical waveguides;

a fourth optical waveguide capable of propagating light in a multi-mode; and an optical filter disposed perpendicularly to a traveling direction of light in said fourth optical waveguide;

said first optical waveguide being connected to a first end face of said fourth optical waveguide, said second and third optical waveguides being connected to predetermined individual positions of a second end face opposed to the first end face of said fourth optical waveguide, said first and second end faces of said fourth optical waveguide being end faces intersecting the traveling direction of light in the fourth optical waveguide, and said fourth optical waveguide being an optical waveguide capable of propagating light in a multi-mode such that upon input of light having a first wavelength from either said second or said third optical waveguide, light corresponding to the light input of the first wavelength can be propagated into said first optical waveguides after passing through the optical filter by the propagation of light in the fourth optical waveguide, and upon input of light having a second wavelength from either the second or the third optical waveguide, light corresponding to the light input of the second wavelength can be propagated into a light input-free optical waveguide out of the second and third optical waveguides through reflection by said optical filter.

2. A wavelength multiplexer according to claim 1, wherein said first, second and third optical waveguides are single-mode optical waveguides.

3. A wavelength multiplexer according to claim 1, wherein the length in the light traveling direction of said fourth optical waveguide is in the range of 1 to 5 mm and the width thereof is in the range of 25 to 70 $\mu$m.

4. A wavelength multiplexer including at least:

first, second and third optical waveguides;

a fourth optical waveguide capable of propagating light in a multi-mode; and an optical filter disposed perpendicularly to a traveling direction of light in said fourth optical waveguide;

said first optical waveguide being connected to a first end face of said fourth optical waveguide, said second and third optical waveguides being connected to predetermined individual positions of a second end face opposed to the first end face of said fourth optical waveguide, and said fourth optical waveguide being an optical waveguide wherein when standardized shapes of light intensity distributions on two planes spaced a predetermined distance from the first and second end faces of the fourth optical waveguide are superimposed one on the other, said shapes are in axial symmetry or approximately axial symmetry with respect to a central axis extending in the light traveling direction of the fourth optical waveguide.

5. A wavelength multiplexer according to claim 4, wherein said first, second and third optical waveguides are single-mode optical waveguides.

6. A wavelength multiplexer according to claim 4, wherein the length in the light traveling direction of said fourth optical waveguide is in the range of 1 to 5 mm and the width thereof is in the range of 25 to 70 $\mu$m.

7. A wavelength multiplexer wherein:

a first optical waveguide is connected to a first end face of a fourth optical waveguide capable propagating light in a multi-mode;

second and third optical waveguides are connected to a second end face opposed to said first end face of said fourth optical waveguide at a predetermined spacing from each other in their connections to said second end face;

an optical filter is installed in said fourth optical waveguide; and an incident plane of said optical filter is parallel or approximately parallel to the wave front of light in each of said first, second and third optical waveguides at the connected position of each of the optical waveguides connected to said fourth optical waveguide.

8. A wavelength multiplexer according to claim 7, wherein said first, second and third optical waveguides are single-mode optical waveguides.

9. A wavelength multiplexer according to claim 7, wherein the length in the light traveling direction of said fourth optical waveguide is in the range of 1 to 5 mm and the width thereof is in the range of 25 to 70 $\mu$m.

\* \* \* \* \*